United States Patent [19]

Denzin

[11] Patent Number: 5,131,708
[45] Date of Patent: Jul. 21, 1992

[54] HANDLING SYSTEM CONFIGURED FOR USE WITH A RECEPTACLE

[75] Inventor: Dirk E. Denzin, Elkhart Lake, Wis.

[73] Assignee: The Vollrath Company, Inc., Sheboygan, Wis.

[21] Appl. No.: 743,820

[22] Filed: Aug. 12, 1991

[51] Int. Cl.⁵ .............................................. B65D 25/00
[52] U.S. Cl. ...................................... 294/168; 16/115; 206/505; 220/95
[58] Field of Search .............. 16/124, 125, 115, 110.5, 16/110 A, 110 R; 206/505, 506, 515, 518, 519; 220/94 R, 95, 96; 294/168, 172

[56] References Cited

U.S. PATENT DOCUMENTS

| | | | |
|---|---|---|---|
| 1,757,475 | 5/1930 | Pratt | 220/95 X |
| 1,867,632 | 7/1932 | Roche | 16/115 X |
| 2,025,149 | 12/1935 | Barkhausen et al. | 16/115 |
| 2,361,351 | 10/1944 | Kollman | 220/95 |
| 2,831,956 | 4/1958 | Fry | 16/115 |
| 3,167,808 | 2/1965 | Lindenberg et al. | 220/94 R X |
| 4,804,092 | 2/1989 | Jones | 206/506 X |

Primary Examiner—Margaret A. Focarino
Assistant Examiner—Joseph D. Pape
Attorney, Agent, or Firm—Foley & Lardner

[57] ABSTRACT

A handling system configured for use with a receptacle having a bottom, sides and a flange. The system has a bail for supporting the receptacle, a guide for guiding the bail, and a stop structure for retaining the bail within the guide. The bail is freely movable within the guide and is movable between two positions. In the first position, the bail extends above the flange in a carrying position. In the second position, the bail extends below the flange in a stowed position. The bail is preferably comprised of two substantially parallel legs connected by a base. The two legs each include a bias structure preferably in the form of a deviation by which the base of the bail is held against an adjacent wall of the receptacle when the bail is in the stowed position. The legs of the bail pass through guide openings in the flange of the receptacle and attach to the stop structure. In the stowed position, the stop structure substantially covers the guide openings in the flange.

10 Claims, 4 Drawing Sheets

HANDLING SYSTEM CONFIGURED FOR USE WITH A RECEPTACLE

BACKGROUND OF THE INVENTION

The present invention is directed to a handling system configured for use with a receptacle, such as a pan. In its preferred embodiment, the present invention is directed to a handle for a pan which is used with a steam table or similar food service arrangement, and which may be nestably stacked for storage.

Food service arrangements, such as steam tables, impose specific requirements upon the design of pans for use therewith. Steam tables generally are constructed with a tank beneath a serving surface. Apertures are located in the serving surface, which apertures provide access to wells within the tank. In operation, steam or hot water flood the tank and come in contact with pans which are nestingly received within the apertures. It is important that there be a good seating of the pans within the apertures, both to preclude the escape of steam from the tank (a burn hazard and an inefficient loss of heat) and to preclude incursions of materials which may be spilled on the serving surface. Incursions of spilled materials into the tank can require draining and cleaning of the tank, a time-consuming and costly activity.

The advantages of handles on pans have long been recognized, especially for pans which may contain a significant mass of hot food. Handles may aid in handling such pans generally, and especially aid placement of such pans into an aperture of a steam table or the like.

Some handling systems have included separable handle apparatuses for use in lifting steam table food pans, such as those disclosed in U.S. Pat. No. 3,179,287 to Rickmeier, Jr., for "Steam Table Food Transfer Pan Assemblages". While certain advantages in handling steam table food pans are realized by Rickmeier's separable handle devices, there are problems with such a design. First, positive contact between the handle and the pan depends upon many factors (e.g., proper location of the handle device with respect to the pan, and ensuring no jostling or other disruption upsets the pan from contact with the handle). A need for separate storage of the handles and the possibility of loss of the separate handle apparatuses disrupting operation in a busy food service atmosphere are inherent shortcomings in such a separable handle design.

Rotatable handles for various receptacles are known in the art, such as those disclosed in U.S. Pat. No. 1,103,169 to Beam for "Combined Dish Drainer, Steamer, Roaster or Baking Pan"; and in U.S. Pat. No. 1,219,969 to Lowe for "Basket".

Rotatable handles located atop a receptacle such as are disclosed in Lowe generally aid in handling the receptacle. However, such handles are not retractable and therefore require special covers to accommodate them or unstably accommodate standard covers. Moreover, such non-retractable handles generally are difficult to clean when food material (e.g., from a spill) is baked onto the handle and its pivot assemblies.

Rotatable handles located on a wall of a receptacle, such as are disclosed in Beam, are inaccessible to a user when the receptacle is installed in a steam table. Further, there is generally very little space available intermediate a receptacle wall and the wall of the steam table well when a receptacle is installed. Rotatable handles as disclosed by Beam have a tendency to interfere with insertion and removal of receptacles with steam tables by further limiting that inter-wall clearance. Thus, handles of the Beam design actually hinder receptacle handling rather than improve such handling.

Attempts have been made to provide retractable handle assemblies, such as those disclosed in U.S. Pat. No. 3,167,808 to Lindenberg et al. for "Handle Support for a Storage Battery Container". The Lindenberg disclosure requires a specific mounting orientation of the handle with respect to its associated container in order to ensure the handle remains close to the wall of the container. Such an orientation is necessary to accommodate the limited inter-wall clearance available between a pan and a wall of a steam table well. Moreover, the Lindenberg design would not limit steam leaks through the guide members in its retracted position. Further, it is unforgiving in its placement, requiring that the handle virtually abut the pan wall to accommodate use of pans employing the Lindenberg device in steam table operations or for nested stacking.

The desirability (for the Lindenberg design) of placing the guide holes for the handle close to the receptacle wall creates certain tooling problems in the manufacture of such pans on a production scale. Specifically, the walls of such receptacles are generally extruded or drawn and, therefore, are not reliably true in their positioning with respect to the flange. The walls are also not reliably true in their departure angle from the flange. As a result, one must offset the guide holes some distance from the wall in order that the wall will not be deformed during the creation of the guide holes, for example, by drilling or punching. Thus there is a predetermined gap necessarily established between the handle and the receptacle wall. Of course, it is desirable that the handle abut the wall of the receptacle when the handle is retracted in order to best accommodate the limited inter-wall clearance between the receptacle and the steam table well.

Nested stacking is accommodated by the rotatable handle disclosed in U.S. Pat. No. 1,219,969 to Lowe (referred to above) by rotating the handle to within the well of the receptacle, thereby providing a shelf upon which a next-higher stacked receptacle may rest. However, with the Lowe device the length of the handle determines the depth of penetration of a nesting receptacle and too high a stack of such receptacles is an undesirable, unstable arrangement.

A retractable handle assembly intended for use with a receptacle in steam table operations is disclosed in German Design Patent No. 79 30 626, issued to Rieber Works for "Warm Food Storage Container". The Rieber apparatus discloses a handle assembly which is similar to the Lindenberg handle assembly. Specifically, the Rieber disclosure involves a straight flat bail with a rounded upper handle portion positioned sufficiently close to the wall of a receptacle to enable the bail to retract intermediate the receptacle wall and the wall of the steam table well. However, the upper handle portion of the Rieber device does not approximate the lip of the container with which it is associated, and therefore it requires either a special cover, which contacts the receptacle inside the handle locations (as shown in FIG. 1 of Rieber), or a lid which is specially contoured to fit in a stable manner over the handle in its retracted orientation. Further, the Rieber device suffers from the same shortcoming of the Lindenberg device in that the Rieber device requires that it be located as close as possible to the wall of the receptacle in order to clear the wall of the steam table well, but the handle does not abut the receptacle wall.

Examples of handles configured for use with a nested container are disclosed in U.S. Pat. No. 4,804,092 to Jones for "Nestable Container"; and in U.S. Pat. No. 4,241,831 to Locatelli for "Handle Particularly for Wire Baskets". The Jones device includes a carrying handle connected with the wall of the receptacle by a resilient hinge which permits the handle position to be displaceable between a carrying configuration in which the handle extends outwardly from the wall and a nesting configuration in which the handle lies adjacent the exterior of the wall. The Jones device would in no way facilitate the lifting of a receptacle from a steam table well since the handle would be inaccessible below the steam table surface when the receptacle is seated within the well. In fact, the resiliency of the handle would likely interfere with extraction of the receptacle from the steam table well since the handle would hang up in the steam table well as the pan is lifted upward. In any event, the Jones handle would not be accessible for grasping by a user until the pan was nearly fully removed from the steam table well.

Locatelli discloses a handle for a wire basket, which handle is rotatable from a carrying orientation to a stacking orientation to accommodate nestable stacking of similar wire baskets. In such a stacked arrangement, upper baskets in the stack rest upon a leg of the handle of the next lower basket. According to Locatelli, an advantage of his design is that a lower basket in a stack may be filled while stacking baskets above. The object of stacking receptacles for storage (as opposed to Locatelli's stacking for filled stowage) is to reduce storage requirements (i.e., the stacking height). That is, the stacking height of pans which are stacked for storage is desirously as low as possible to accommodate the maximum number of receptacles in a given storage area while also ensuring maximum stability for a stack of receptacles.

Accordingly, there is a need for a handling assembly for use with a receptacle used in a steam table well, which handling assembly is retractable without significantly degrading steam table efficiency or operations, accommodates standard receptacle lids, is easily accessible for use in removing the receptacle from the steam table well or inserting the receptacle in the steam table well, and which accommodates nested stacking for storage.

SUMMARY OF THE INVENTION

The invention is a handling system configured for use with a receptacle, which receptacle includes a well bounded by a plurality of walls preferably having a common upper terminus which includes a flange depending outwardly from the well. The system of the present invention comprises a bail for supporting the receptacle; a guide structure for guiding the bail; and a stop structure for retaining the bail within the guide structure. The bail is movable within the guide structure between a first position and a second position. The bail extends a first distance above the flange in the first position, which first distance is appropriate to accommodate carrying the pan by the bail; and the bail extends a second distance below the flange in the second position. The stop structure is operatively connected with at least one of the bail and the guide structure, and the stop structure cooperates with the guide structure and the bail to orient the bail in the first position. The bail includes a bias structure for biasing the bail against a wall of the receptacle when the bail is in the second position.

In its preferred embodiment, the bail comprises a generally flat handle member with two leg members depending therefrom in general parallel relation and joined at their ends distal from the flat handle member by a base member. The two leg members extend through apertures in the flange, which apertures comprise the guide structure of the system.

Further in the preferred embodiment, the handle member, the two depending leg members, and the base member are all integrally formed with smooth contours between the two leg members and the base member to preclude the possibility of snagging of the handle system on workers' aprons or the like.

It is, therefore, an object of the present invention to provide a handling system configured for use with a receptacle which is retractable with respect to the receptacle without interfering with use of the receptacle in a steam table apparatus.

A further object of the present invention is to provide a handling system configured for use with a receptacle which, in a steam table environment, minimizes steam loss from beneath a steam table and limits spill incursions to beneath a steam table when the handling system is in a retracted position and the receptacle is inserted in a steam table well.

Yet a further object of the present invention is to provide a handling system configured for use with a receptacle which stably accommodates standard receptacle covers.

Still a further object of the present invention is to provide a handling system configured for use with a receptacle which presents generally smooth contours to preclude snagging of the handling system by aprons o other clothing of users of receptacles incorporating the present invention.

Yet a further object of the present invention is to provide a handling system configured for use with a receptacle which accommodates nested stacking of receptacles for storage.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
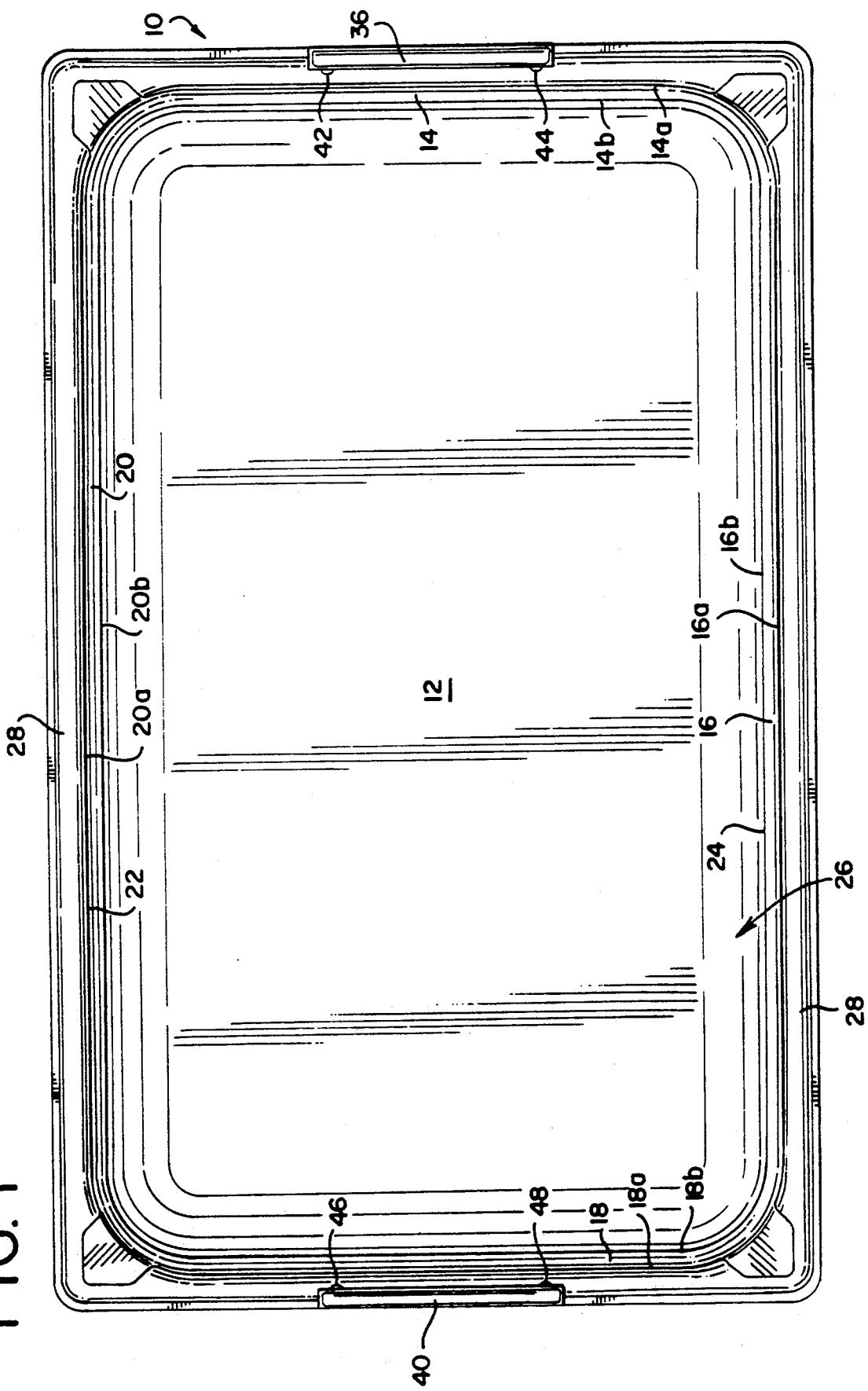
FIG. 1 is a top plan view of a receptacle incorporating the handling system of the present invention.

FIG. 1 is a top plan view of a receptacle incorporating the handling system of the present invention. In FIG. 1, receptacle 10 has a bottom 12, preferably of generally rectangular shape, and a plurality of walls 14, 16, 18, 20. Wall 14 terminates in an upper terminus 14a and a lower terminus 14b. Wall 16 terminates in an upper terminus 16a and a lower terminus 16b. Wall 18 terminates in an upper terminus 18a and a lower terminus 18b. Wall 20 terminates in an upper terminus 20a and a lower terminus 20b. The various upper termini 14a, 16a, 18a, 20a form a common upper terminus 22. The various lower termini 14b, 16b, 18b, 20b form a common lower terminus 24.

Common upper terminus 22 generally lies in an upper plane and common lower terminus 24 generally lies in a lower plane. Preferably, the upper plane is substantially parallel to the lower plane. Walls 14, 16, 18, 20 are preferably tapered to facilitate nesting engagement of the receptacle within a second receptacle. Therefore, common upper terminus 22 subtends a larger area in the upper plane than the area subtended by common lower terminus 24 in the lower plane.

Thus, bottom 12 and walls 14, 16, 18, 20 cooperate to form an open-topped well 26. Walls 14, 16, 18, 20 are preferably extended upward past common upper terminus 22 and outward from well 26 to form a flange 28 which serves to strengthen the receptacle. Flange 28 includes guide openings 42, 44, 46, 48. Receptacle 10 is preferably formed from stainless steel or like material.

To facilitate understanding the present invention, like elements will be identified by like reference numerals in the various drawings.

Figure 2:
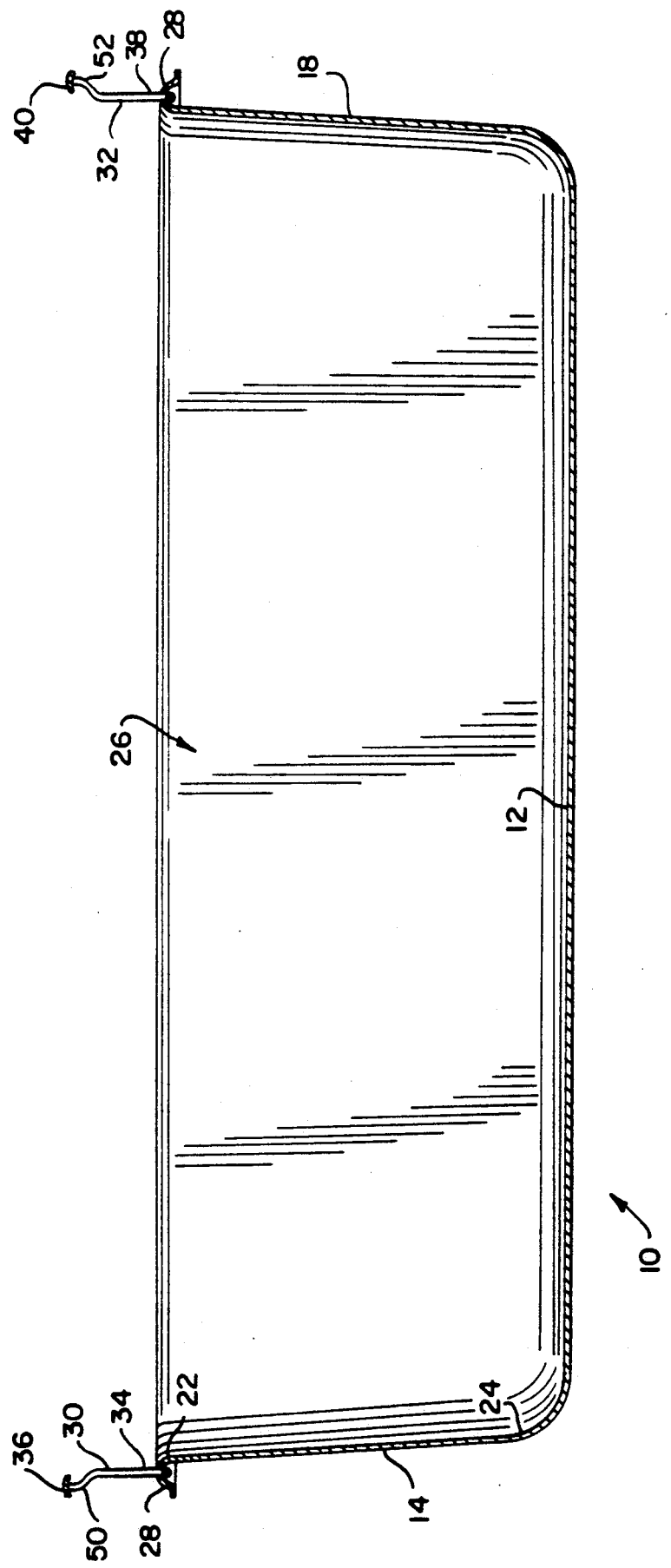
FIG. 2 is a side view in partial section of a receptacle incorporating the preferred embodiment of the present invention.

FIG. 2 is a side view in partial section of a receptacle incorporating the preferred embodiment of the present invention. In FIG. 2, handles 30, 32 are shown in their extended, carrying position. Handle 30 includes a bail or bight member 34 and a stop 36. Handle 32 includes a bail 38 and a stop or bar member 40. When handles 30, 32 are in the extended position, bails 34, 38 engage flange 28 to support receptacle 10. Stops 36, 40 are preferably rigidly attached to bails 34, 38 to provide a strong, secure means for carrying receptacle 10.

Bail 34 extends through guide openings 42, 44. Bail 38 extends through guide openings 46, 48. Bails 34, 38 are free to slide in guide openings 42, 44 and guide openings 46, 48, respectively. From the carrying position shown in FIG. 2, bails 34, 38 may slide to a stowed position in which stops 36, 40 engage flange 28.

In the stowed position, stops 36, 40 are substantially flush against flange 2 and preferably cover guide openings 42, 44, 46, 48. Such a substantially flush fit of stops 36, 40 against flange 28 prevents material from passing through guide openings 42, 44, 46, 48, as when receptacle 10 is used to hold food and is inserted in a steam table assembly. When stops 36, 40 are substantially flush against flange 28, the escape of steam through guide openings 42, 44, 46, 48 is substantially inhibited, thus improving the efficiency of steam table heating and eliminating a burn hazard. Further, when stops 36, 40 are substantially flush against flange 28, incursion of food and other material from above receptacle 10 into the steam table interior is substantially prevented. The ability of handles 30, 32 to freely slide within guide openings 42, 44, 46, 48 also facilitates cleaning of handles 30, 32 and receptacle 10.

In addition to covering guide openings 42, 44, 46, 48, the substantially flush fit of stops 36, 40 against flange 28 allows standard lids to properly fit receptacle 10 in a stable orientation with no interference from stops 36, 40. A lid that is loose fitting, ajar, or askew may allow contents of receptacle 10 to cool, to spill, or may create a burn hazard. When handles 30, 32 are in the stowed position with stops 36, 40 substantially flush against flange 28, stops 36, 40 project above the level of flange 28 a distance equal to only the thickness of stops 36, 40, preferably less than 1/16-inch. Such a low profile presented by stops 36, 40 ensures that stops 36, 40 do not interfere with proper seating of standard lids upon receptacle 10.

Bail 34 includes a bias structure in deviation 50. Bail 38 includes a bias structure in deviation 52. Deviations 50, 52 bias bails 34, 38, respectively, toward walls 14, 18 of receptacle 10 to substantially abut walls 14, 18 when handles 30, 32 are in the stowed position, in a manner to be described hereinafter.

Figure 3:
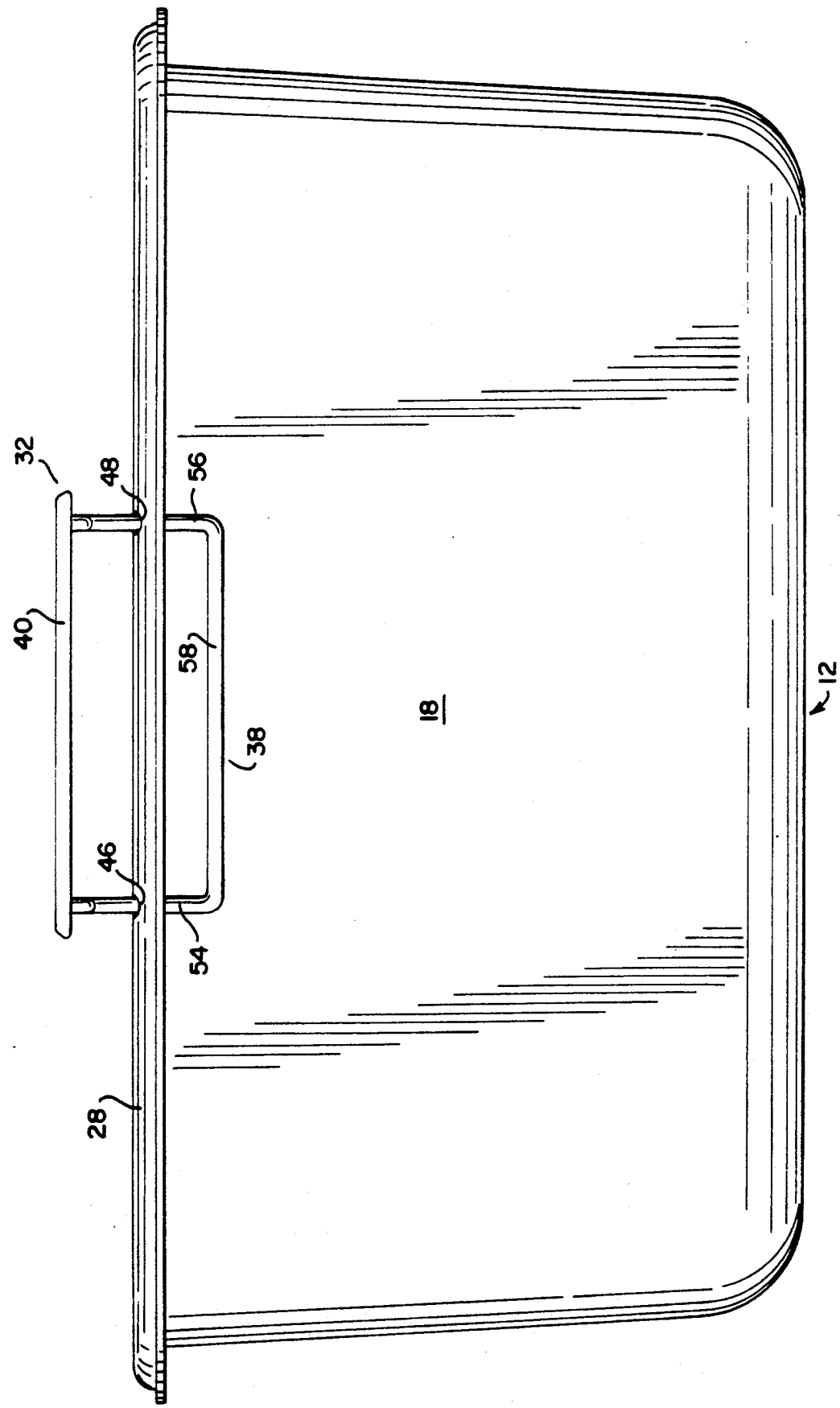
FIG. 3 is an end elevation of a receptacle incorporating the preferred embodiment of the present invention.

FIG. 3 is an end elevation of a receptacle incorporating the preferred embodiment of the present invention. In FIG. 3, handle 32 is shown in a position intermediate its fully extended carrying position and its stowed position. FIG. 3 shows stop 40 attached to bail 38. Stop 40 preferably presents a broad, flat surface to facilitate comfortable carrying of receptacle 10 and to ensure a substantially flush fit against flange 28, and further facilitates covering guide openings 46, 48. Stop 40 is preferably formed of stainless steel.

Bail 38 is preferably formed from a single, integral unit, such as, for example, 3/16-inch stainless steel wire. Bail 38 is formed so as to include base 58 and two substantially parallel legs 54, 56. Legs 54, 56 pass through guide openings 46, 48, respectively, and are attached to stop 40. By such structure, handle 32 may slide from its fully extended carrying position, in which base 58 engages the underside of flange 28, to its stowed position, in which stop 40 engages the topside of flange 28.

Figure 4:
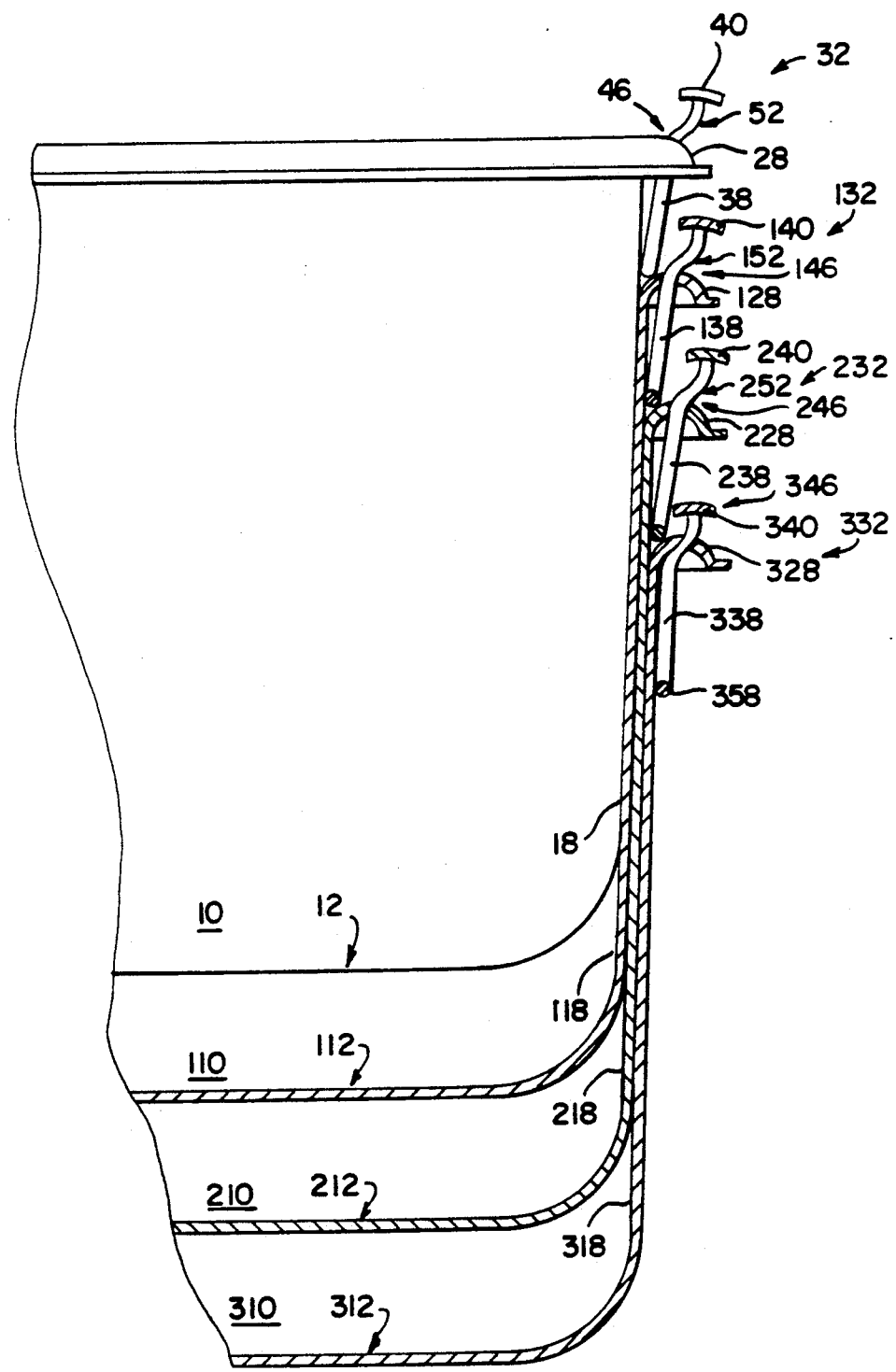
FIG. 4 is a side view in partial section of a plurality of receptacles which incorporate the preferred embodiment of the present invention in nested stacked relation.

FIG. 4 is a side view in partial section of a plurality of receptacles which incorporate the preferred embodiment of the present invention in nested, stacked relation. In FIG. 4, receptacle 10 is nested in receptacle 110; receptacle 110 is nested in receptacle 210 and receptacle 210 is nested in receptacle 310.

FIG. 4 shows the manner in which handles 32, 132, 232, 332 are positioned when receptacles 10, 110, 210, 310 are nested. Bail 38 of receptacle 10 slides through guide openings 46, 48 to a position intermediate its fully extended carrying position and its stowed position. Bails 138, 238 similarly slide to intermediate positions on receptacles 110, 210. Deviation 52 allows base 58 of bail 38 to rest in a nested position intermediate wall 18 of receptacle 10 and flange 128 of receptacle 110. Similarly, deviation 152 allows base 158 of bail 138 to rest in a nested position intermediate wall 118 of receptacle 110 and flange 228 of receptacle 210, and deviation 252 allows base 258 of bail 238 to rest in a nested position intermediate wall 218 of receptacle 210 and flange 328 of receptacle 310.

In such positions, handles 32, 132, 232 do not interfere with nesting or de-nesting of receptacles 10, 110, 210, 310. Deviations 52, 152, 252 allow bails 38, 138, 238 to slide upward through guide openings 46, 48, 146, 148, 246, 248 and to tilt at an angle relative to walls 18, 118, 218 when nested. Thus, stops 40, 140, 240 are displaced from flanges 28, 128, 228, thereby allowing an upper receptacle to nestingly slide into an immediately subjacent receptacle without interference from the handle on the subjacent receptacle.

FIG. 4 also illustrates handle 332 in its stowed position with stop 340 engaging flange 328. Guide openings 346, 348 are located in flange 328 at a position which is offset from wall 318 in order to accommodate manufacturing tolerances, and deviation 352 creates an offset between guide openings 346, 348 and base 358 of bail 338. Preferably, the lateral offset of bail 338 established by deviation 352 is substantially equal to the offset between guide openings 346, 348 and wall 318. By such structure deviation 352 biases base 358 of bail 338 adjacent wall 318 when handle 332 is in its stowed position, thereby accommodating the limited inter-wall clearance between receptacle 310 and an adjacent steam table well when receptacle 310 is used in a steam table.

Handles 30, 32 facilitate insertion into a steam table well and extraction from a steam table well of receptacle 10. When handles 30, 32 are in their extended position for carrying receptacle 10, base 58 of handle 32 engages the underside of flange 28 and thereby supports receptacle 10. Thus, in the extended position for carrying, bails 34, 38 are clear of the steam table and do not interfere with insertion of receptacle 10 in the steam table well.

When receptacle 10 is to be extracted from a steam table well, handles 30, 32 are in their stowed position. Stops 36, 40 provide a positive, easily accessible grasp point for handles 30, 32 and handles 30, 32 are freely slideable to their extended carrying position to facilitate lifting of receptacle 10 from the steam table well. Similarly, when receptacles incorporating the present invention are to be de-nested, handles 30, 32 are in their intermediate position (FIG. 4) and stops 36, 40 permit easy grasping of handles 30, 32 for facilitating de-nesting.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

I claim:

1. A handling system configured for use with a receptacle, said receptacle including a well bounded by a plurality of walls, at least one wall of said plurality of walls having an upper terminus, including a flange depending outwardly from said well, the system comprising:
    a bail means for supporting said receptacle;
    a guide means for guiding said bail means; and
    a stop means for retaining said bail means within said guide means;
    said bail means being movable within said guide means between a first position and a second position; said bail means extending a first distance above said flange in said first position, said first distance being appropriate to accommodate carrying said pan by said bail means; said bail means extending a second distance below said flange in said second position; said stop means being operatively connected with said bail means, said stop means cooperating with said guide means and said bail means to orient said bail means in said first position; said bail means including a bias means for biasing said bail means against said at least one wall when said bail means is in said second position.

2. A handling system configured for use with a receptacle as recited in claim 1 wherein said guide means comprises at least one aperture in said flange, said at least one aperture slidingly receiving said bail means.

3. A handling system configured for use with a receptacle as recited in claim 1 wherein said bail means comprises a generally flat handle member and two leg members depending from said handle member in generally parallel relation.

4. A handling system configured for use with a receptacle as recited in claim 3 wherein said guide means comprises a pair of apertures in said flange, each aperture of said pair of apertures slidingly receiving one of said two leg members.

5. A handling system configured for use with a receptacle as recited in claim 3 wherein said bias means comprises a deviation in each of said leg members, said guide means being situated a first lateral displacement from said at least one wall, said deviation establishing a second lateral displacement of a first segment of each of said leg members from a second segment of each of said leg members, said first segment being proximate said flange when said bail means is in said second position, said first lateral displacement being generally equal with said second lateral displacement whereby said second segment lies generally adjacent said at least one wall when said bail means is in said second position.

6. A handling system configured for use with a receptacle as recited in claim 4 wherein said bias means comprises a deviation in each of said leg members, said guide means being situated a first lateral displacement from said at least one wall, said deviation establishing a second lateral displacement of a first segment of each of said leg members from a second segment of each of said leg members, said first segment being proximate said flange when said bail means is in said second position, said first lateral displacement being generally equal with said second lateral displacement whereby said second segment lies generally adjacent said at least one wall when said bail means is in said second position.

7. A handle for lifting a receptacle, said receptacle including a well bounded by a bottom and a plurality of walls, said plurality of walls having a common upper terminus, said upper terminus including a flange depending outwardly from said well, said flange having a plurality of apertures laterally displaced a first displacement from said at least one wall, the handle comprising:
    a bar member; and
    a bight member;
    said bight member including a pair of leg members, said pair of leg members being joined at a first end by a base member; each of said pair of leg members being received through one aperture of said plurality of apertures; each of said pair of leg members being attached with said bar member at a second end, said flange being intermediate said first end and said second end; the handle being slidingly movable between a carrying position and a stowed position; said bight member cooperating with said flange to establish said carrying position; said bar member cooperating with said flange to establish said stowed position; each of said pair of leg members presenting at least two non-colinear, generally parallel primary segments, adjacent segments of said at least two segments being joined by oblique secondary segments, the primary segment of said at least two primary segments most distal from said bar member lying generally adjacent a selected wall of said plurality of walls when the handle is in said stowed position.

8. A handle for lifting a receptacle as recited in claim 7 wherein said plurality of apertures is two apertures.

9. A handle for lifting a receptacle as recited in claim 7 wherein said at least two primary segments is two primary segments.

10. A handle for lifting a receptacle as recited in claim 8 wherein said at least two primary segments is two primary segments.

* * * * *